(12) United States Patent
Fallon et al.

(10) Patent No.: US 9,064,209 B2
(45) Date of Patent: Jun. 23, 2015

(54) PRINTING THROUGH PHYSICAL PROXIMITY BETWEEN PRINTER AND PRINT CLIENT DEVICE

(75) Inventors: Michael F. Fallon, Tiverton, RI (US); Myles Wilde, Charlestown, MA (US); Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,371

(22) PCT Filed: Oct. 1, 2011

(86) PCT No.: PCT/US2011/054490
§ 371 (c)(1),
(2), (4) Date: Apr. 23, 2014

(87) PCT Pub. No.: WO2013/048533
PCT Pub. Date: Apr. 4, 2013

(65) Prior Publication Data
US 2014/0226175 A1    Aug. 14, 2014

(51) Int. Cl.
| | | |
|---|---|---|
| G06F 15/00 | (2006.01) | |
| G06F 3/12 | (2006.01) | |
| G06K 1/00 | (2006.01) | |
| G06K 15/00 | (2006.01) | |
| G06F 21/60 | (2013.01) | |
| H04W 12/06 | (2009.01) | |
| G06F 21/35 | (2013.01) | |
| G06F 21/44 | (2013.01) | |
| H04L 29/06 | (2006.01) | |

(52) U.S. Cl.
CPC .......... *G06K 15/4095* (2013.01); *G06F 3/1204* (2013.01); *G06F 3/1222* (2013.01); *G06F 3/1236* (2013.01); *G06F 3/1244* (2013.01); *G06F 3/1292* (2013.01); *G06F 21/608* (2013.01); *H04W 12/06* (2013.01); *G06F 21/35* (2013.01); *G06F 21/445* (2013.01); *G06F 3/1238* (2013.01); *G06F 3/1285* (2013.01); *H04L 63/0492* (2013.01)

(58) Field of Classification Search
CPC . G06K 15/4095; G06F 3/1204; G06F 3/1222; G06F 3/1236; G06F 3/1244; G06F 3/1292
USPC ................................ 358/1.1, 1.13, 1.14, 1.15
See application file for complete search history.

(56) References Cited

U.S. PATENT DOCUMENTS

| | | |
|---|---|---|
| 2003/0120954 A1 | 6/2003 | Sugiyama |
| 2006/0013402 A1 | 1/2006 | Sutton, II et al. |
| 2013/0159021 A1* | 6/2013 | Felsher ............................ 705/3 |

FOREIGN PATENT DOCUMENTS

WO        2013/048533 A1    4/2013

OTHER PUBLICATIONS

International Search Report and Written Opinion received for PCT application No. PCT/US2011/054490, mailed on May 10, 2012, 11 pages.
International Preliminary Report on Patentability and Written Opinion received for PCT Patent Application No. PCT/US2011/054490, mailed on Apr. 10, 2014, 8 pages.

* cited by examiner

*Primary Examiner* — Douglas Tran
(74) *Attorney, Agent, or Firm* — Jordan IP Law, LLC

(57) ABSTRACT

Systems and methods of operating a computing system may involve utilizing an interactive physical event between a client device and a target printer to unambiguously select the target printer. In one example, upon such an interactive event, a mutual identification method may be implemented between the client device and the target printer, followed by creation of a secure point-to-point communication link over which a print request may be executed.

30 Claims, 2 Drawing Sheets

100

US 9,064,209 B2

PRINTING THROUGH PHYSICAL PROXIMITY BETWEEN PRINTER AND PRINT CLIENT DEVICE

BACKGROUND

1. Technical Field

Embodiments generally relate to a print client unambiguously selecting a target printer. More particularly, embodiments relate to utilizing physical proximity to unambiguously select a target printer and securely print a document.

2. Discussion

A challenge with printing documents in public setting may be that current processes can be cumbersome and may not be secure. For example, when a user utilizes a public printer to print a document, the user often may first "find" the printer (e.g., using network address or email address) and then install a particular driver for that printer. Moreover, a print request may be sent through a cloud computing infrastructure before being sent before being sent to a target printer. Printing through a cloud may be inherently insecure, as one or more computing components of the cloud may retain access to the user's document.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a computer implemented method including detecting an interactive event between a print client and a target printer, transmitting a security protocol communication including an authentication element to the print client, and conducting a verification process based on the authentication element. The method may also provide for transmitting a response communication including the verification of the authentication element and transmitting a file to the target printer for printing.

Embodiments can also involve a computer readable storage medium including a set of instructions, which, if executed by a processor, cause a computer to detect an interactive event between a print client and a target printer, receive a security protocol communication including an authentication element, and prompt a verification process including the authentication element. The instructions may also cause a computer to transmit a response communication including a verification of the authentication element, and transmit a file to the target printer for printing.

In addition, embodiments may include a computer readable storage medium including a set of instructions, which, if executed by a processor, cause a computer to detect an interactive event between a print client and a target printer and transmit a security protocol communication including an authentication element. The instructions may also cause a computer to receive a response communication including a verification of the authentication element and receive a file for printing.

Other embodiments can include a system having a client processing component, a client memory device, a printer processing component, and a printer memory device. The client memory device may include a client-side proximate printing application having a set of instructions for execution by the client processing component, and the printer memory device may include a printer-side proximate printing application having a set of instructions for execution by the printer processing component. The client-side proximate printing application and the printer-side proximate printing application may be configured to detect an interactive event between a print client and a target printer and transfer a security protocol communication including an authentication element to the print client. The client-side proximate printing application and the printer-side proximate printing application may also be configured to conduct a verification process based on the authentication element and transfer a response communication including the verification of the authentication element to the target printer.

Figure 1:
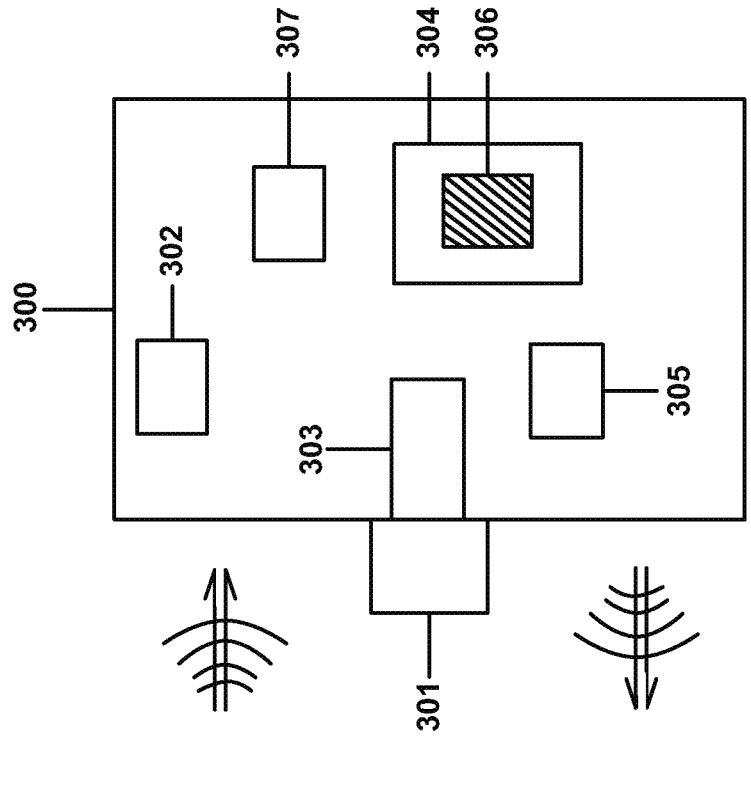
FIG. 1 is a block diagram of an example of a computing system that utilizes a proximate printing process in accordance with an embodiment of the invention.
Figure 1:
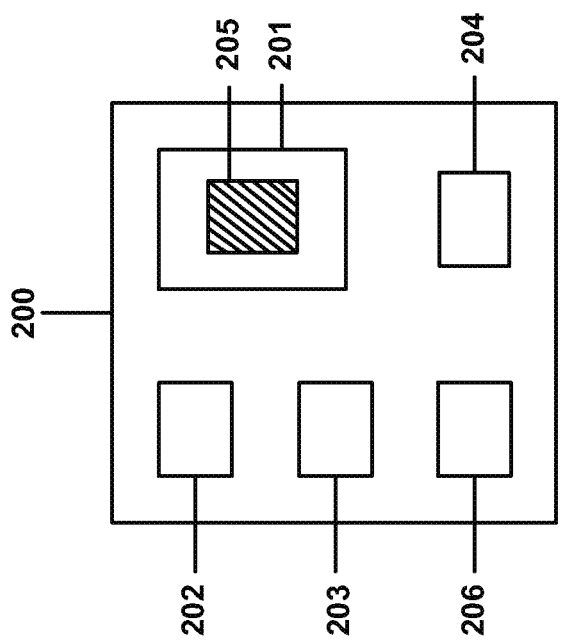

Turning now to FIG. 1, a block diagram of a computing system 100 is shown in which a print client and a printer utilize a proximate printing method. The computer system 100 may include a print client 200 coupled to printer 300.

The print client 200 may be any electronic device capable of directing a print request, including a mobile device (e.g., a mobile/smart phone, a personal digital assistant, a tablet device), a notebook computer, or a desktop computer. In the embodiment illustrated in FIG. 1, the print client 200 may be a tablet computer device utilizing the Android operating system (OS). The print client 200 may include client device memory 201, client processing component 202, client transceiver 203, client proximate printing logic 204, and client interface 206.

The client device memory 201 may include a memory device that may be used to store data. The client device memory 201 may be built into the print client 200, or may be a removable peripheral storage device coupled to the client device memory 201. The client device memory 201 may store software applications including computer-readable executable instructions that may be executed by a processing component. For example, the client device memory 201 may include a client-side proximate printing application 205.

As will be discussed in greater detail, the client-side proximate printing application 205 may be implemented to interact with the printer 300 (and printer-side proximate printing application 306) to complete print requests according to a proximate printing method embodiment described herein. For example, the client-side proximate printing application 205 may be configured to, among other things, conduct a verification process based on authentication information sent from the printer 300. The client-side proximate printing application 205 may be included as part of applications available on the print client 200 upon purchase, or may be downloaded separately to the print client 200 (e.g., as a mobile phone application or "widget").

The client processing component 202 may include at least one computer processor that executes computer-readable executable instructions. For example, the client-processing component 202 may execute software applications such as the client-side proximate printing application 205.

The client transceiver 203 may be a transmitter/receiver that enables the print client 200 to wirelessly communicate with other wirelessly-capable devices (e.g., printer 300). In this embodiment, the print client 200 and the printer 300 communicate according to a Bluetooth protocol (e.g., IEEE 802.15.1-2005, Wireless Personal Area Networks). Accordingly, the print client 200 and the printer 300 may utilize a Bluetooth "bonding" algorithm by which one device may detect a presence of another, and engage in a "pairing" method wherein both confirm each other's identities before forming a communication path over which data may be transferred between the two devices. In other embodiments of the present invention, wireless communication may take place according to other wireless communication protocols (e.g., near-field communication, Wi-Fi (e.g., IEEE 802.11, Wireless Personal Area Networks)).

As will be discussed in greater detail, the client proximate printing logic 204 may be one or more logic components included on the print client 200 configured to implement a proximate printing method as described herein. In addition, the print client 200 may include a client interface 206. In this embodiment, the client interface 206 is a tablet device screen including a graphical user interface (GUI) through which the user can interact with the tablet device.

Turning now to printer 300, printer 300 may include any device coupled to the print client 200 capable of receiving a print request and executing it. In this embodiment, the printer 300 includes printer appendage 301, printer transceiver 302, printer proximate printing logic 303, printer memory 304, printer driver store 305 and printer processing component 307.

Similar to the client transceiver 203, the printer transceiver 302 may enable the printer 300 to communicate wirelessly according to various wireless communication protocols with other devices, such as the print client 200. In this embodiment, the printer transceiver 302 enables the printer 300 to communicate with the print client 200 according to a Bluetooth protocol.

The printer memory 304 may be a memory device that may be used to store data. For example, the printer memory 304 may be utilized to store printer-side proximate printing application 306. As will be discussed in greater detail, the printer-side proximate printing application 306 may be a software application that may be executed to implement the proximate printing method described herein. For example, printer-side proximate printing application 306 may be configured to, among other things, recognize the print client 200 and initiate a security protocol communication including an authentication element to authenticate the identity of the print client 200. The printer-side proximate printing application 306 may be included as part of applications residing on the printer 300 upon purchase, or may be installed separately.

Printer processing component 307 may include at least one computer processor to execute computer-readable executable instructions. For example, the printer-processing component 307 may be utilized to execute software applications such as a printer-side proximate printing application 306.

The printer appendage 301 may include a sensor configured to recognize an interactive "event" with the print client 200. For example, in a first embodiment, the printer appendage 301 may include a physical contact sensor (i.e., to detect physical contact) that recognizes an interactive event when the print client 200 may be brought into contact with the printer appendage 301. In other embodiments, the printer appendage 301 may include a sensor having a microphone configured to detect a sound-based interactive event with the print client 200. In another embodiment, the printer appendage 301 may include a sensor having an accelerometer to detect a vibration-based interactive event with the print client 200. Objectives of effecting and detecting such an interactive event may include allowing a print client, such as print client 200, to unambiguously identify a target printer, and allowing the target printer to detect and recognize a particular print client to the exclusion of any other eligible devices in the vicinity.

The printer appendage 301 may be coupled to printer proximate printing logic 303. The printer proximate printing logic 303 may include logic components that may be configured to, in response to an interactive event detected by the printer appendage 301, transmit a signal requesting initiation of the printer-side proximate application 306.

Figure 2:
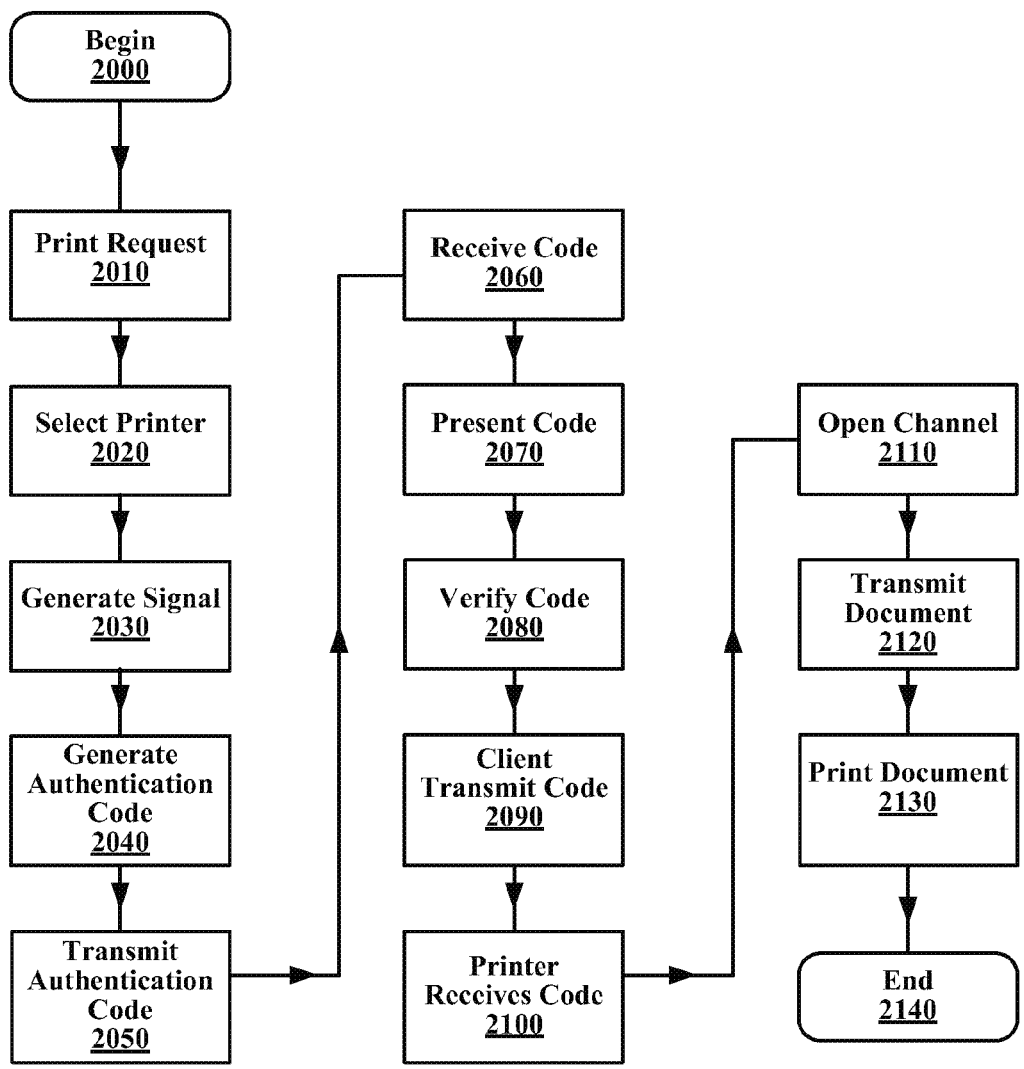
FIG. 2 is a flowchart of an example of a method of proximate printing process in accordance with an embodiment of the invention.

Turning now to FIG. 2, a flowchart of an exemplary method of proximate printing according to one embodiment of the present invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, a user utilizes a tablet personal computer (PC) operating an Android OS, such as the print client 200 (FIG. 1) already discussed, to direct a print request to a printer, such as the printer 300 (FIG. 1) discussed above. Both devices may communicate wirelessly according to a protocol such as, for example, the Bluetooth protocol.

The method begins at processing block 2000. At processing block 2010, a user may initiate the print request on the user's tablet PC through a general mobile application. In response, the tablet OS may prompt the user to indicate a target printer. At processing block 2020, the user may unambiguously select a target printer such as the printer 300 (FIG. 1) discussed above, by utilizing an interactive event. In this embodiment, the interactive event constitutes the user placing the tablet PC on top of a printer appendage, such as the printer appendage 301 (FIG. 1) discussed above. A physical contact/vibration detection sensor located in the printer appendage of the printer may recognize this interactive event.

At processing block 2030, the interactive event may cause printer proximate printing logic, such as proximate printing logic 303 (FIG. 1) discussed above, to transmit a signal to have a printer processor, such as the printer processor 307 (FIG. 1) discussed above, initiate a printer-side proximate printing application, such as the printer-side proximate printing application 306 (FIG. 1) discussed above. At processing block 2040, the printer-side proximate printing application may transmit a security protocol communication to verify the identity of the print client, including transmitting an authentication element (e.g., a unique session code) to be sent to the user's tablet PC. At processing block 2050, the printer may utilize a printer transceiver, such as the printer transceiver 302 (FIG. 1) discussed above, to transmit the security protocol communication including the authentication element to the user's tablet PC in Bluetooth format. At processing block 2060, the tablet PC may receive the security protocol communication including the unique session code.

At processing block 2070, upon receiving this security protocol communication, the client-side proximate printing application, such as the client-side proximate printing application 205 (FIG. 1) discussed above, may be initiated. The client-side proximate printing application may present the authentication element to the user via the tablet PC display, such as the client interface 206 (FIG. 1), as discussed above. At processing block 2080, the client-side proximate printing application may conduct a verification process to verify the status of the print client utilizing the authentication element. In this embodiment, the verification constitutes entering the unique session code by, for example, entering the unique session code via a touch-pad interface on the user's tablet PC display. At processing block 2090, the user may utilize the client-side proximate printing software to direct the tablet PC to transmit a response communication including verification of the authentication element back to the printer.

At processing block 2100, the printer may receive the response communication from the user's tablet PC, and utilize it to verify the status of the user's tablet PC as the print client. At processing block 2110, a secure point-to-point communication channel between the user's tablet PC and the printer may be opened, and the printer-side proximate printing application may send a request communication to send the print file via the communication channel to the tablet PC. At processing block 2120, the print client may receive the request communication from the printer, and in response, may transmit the print file to the printer in secure (e.g., encrypted) format. At processing block 2130, the printer may receive the print file and print it. At processing block 2140, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications and alterations.

For example, in the embodiment described in FIG. 2, a user may initiate a print request before selecting the target printer. In other embodiments of the present invention, however, the user to may initiate the print request after a secure point-to-point communication channel may be opened between the client device and a printer.

Furthermore, in the embodiment described in FIG. 2, the print file may be transmitted after a secure point-to-point communication may be opened and a request communication may be sent. In other embodiments of the present invention, however, the user may be prompted to send the print file along with the return communication back to the printer including the authentication code.

In addition, in the embodiment described in FIG. 2, the client-side proximate printing software may be initiated upon receiving a security protocol communication including the unique session code. However, in other embodiments, the client-side proximate printing software may be activated upon detection of an interactive event. That is, the print client may include a sensor similar to those described above (e.g., physical contact sensor, a microphone, an accelerometer). The sensor may activate a logic component located on the print client configured to activate the client side-proximate printing software.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in processing block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A method comprising:

detecting an interactive event between a print client and a target printer;

transmitting a security protocol communication to the print client, the security protocol communication including an authentication element;

conducting a verification process based on the authentication element;
transmitting a response communication including the verification of the authentication element; and
transmitting a file to the target printer for printing.

2. The method of claim 1, wherein the authentication element is a unique session code.

3. The method of claim 1, wherein a printer-side proximate printing application at the target printer transmits the security protocol communication including the authentication element to the print client.

4. The method of claim 3, wherein a client-side proximate printing application at the print client conducts the verification process based on the authentication element, and transmits the response communication including the verification of the authentication element.

5. The method of claim 4, wherein the client-side proximate printing application is initiated responsive to the printer-side proximate printing application transmitting the security protocol communication to the print client.

6. The method of claim 1, wherein the detecting of the interactive event includes detecting a sensor activation.

7. The method of claim 6, wherein the sensor activation prompts a target printer logic component to transmit a signal to initiate the printer-side proximate printing application.

8. The method of claim 7, wherein the interactive event includes the print client being placed in direct contact with the target printer.

9. A non-transitory computer readable storage medium comprising a set of instructions, which, if executed by a processor, cause a computer to:
detect an interactive event between a print client and a target printer;
receive a security protocol communication including an authentication element;
conduct a verification process based on the authentication element;
transmit a response communication including a verification of the authentication element; and
transmit a file to the target printer for printing.

10. The medium of claim 9, wherein the authentication element is to include a unique session code.

11. The medium of claim 9, wherein the security protocol communication is to be received from a printer-side proximate printing application at the target printer.

12. The medium of claim 11, wherein a client-side proximate printing application at the print client is to conduct the verification process based on the authentication element, and transmit the response communication including the verification of the authentication element.

13. The medium of claim 12, wherein the client-side proximate printing application is to be initiated responsive to the printer-side proximate printing application transmitting the security protocol communication to the print client.

14. The medium of claim 9, wherein the detecting of the interactive event is to include detecting a sensor activation.

15. The medium of claim 14, wherein the sensor activation is to prompt a target printer logic component to transmit a signal to initiate the printer-side proximate printing application.

16. The medium of claim 15, wherein the interactive event is to include the print client being placed in direct contact with the target printer.

17. A non-transitory computer readable storage medium comprising a set of instructions, which, if executed by a processor, cause a computer to:
detect an interactive event between a print client and a target printer;
transmit a security protocol communication including an authentication element;
receive a response communication including a verification of the authentication element; and
receive a file for printing.

18. The medium of claim 17, wherein the authentication element is to be a unique session code.

19. The medium of claim 17, wherein a printer-side proximate printing application at the target printer is to transmit the security protocol communication including the authentication element to the print client.

20. The medium of claim 19, wherein the response communication including the verification of the authentication element is to be received from a client-side proximate printing application at the print client.

21. The medium of claim 20, wherein the client-side proximate printing application is to be initiated responsive to the printer-side proximate printing application transmitting the security protocol communication to the print client.

22. The medium of claim 17, wherein the detecting of the interactive event is to include detecting a sensor activation.

23. The medium of claim 22, wherein the sensor activation is to prompt a target printer logic component to transmit a signal to initiate the printer-side proximate printing application.

24. The medium of claim 23, wherein the interactive event is to include the print client being placed in direct contact with the target printer.

25. A system comprising:
a client processing component;
a client memory device including a client-side proximate printing application having a set of instructions to be executed by the client processing component;
a printer processing component; and
a printer memory device including a printer-side proximate printing application having a set of instructions to be executed by the printer processing component,
wherein the client-side proximate printing application and the printer-side proximate printing application are configured to:
detect an interactive event between a print client and a target printer;
transfer a security protocol communication including an authentication element to the print client;
conduct a verification process based on the authentication element; and
transfer a response communication including the verification of the authentication element to the target printer.

26. The system of claim 25, wherein the authentication element is to be a unique session code.

27. The system of claim 25, wherein the client-side proximate printing application is to be initiated responsive to the printer-side proximate printing application transmitting the security protocol communication to the print client.

28. The system of claim 25, wherein the detecting of the interactive event is to include detecting a sensor activation.

29. The system of claim 28, wherein the sensor activation is to prompt a target printer logic component to transmit a signal to initiate the printer-side proximate printing application.

30. The system of claim 29, wherein the interactive event is to include the print client being placed in direct contact with the target printer.

* * * * *